United States Patent [19]

Yamada

[11] Patent Number: 5,244,969
[45] Date of Patent: Sep. 14, 1993

[54] GOLF BALL
[75] Inventor: Mikio Yamada, Kobe, Japan
[73] Assignee: Sumitomo Rubber Industries, Ltd., Hyogo, Japan
[21] Appl. No.: 899,177
[22] Filed: Jun. 15, 1992

Related U.S. Application Data

[63] Continuation of Ser. No. 638,808, Jan. 8, 1991, abandoned.

[30] Foreign Application Priority Data

Jan. 10, 1990 [JP] Japan ......................................... 2-3803

[51] Int. Cl.$^5$ ........................ C08L 33/08; A63B 37/12
[52] U.S. Cl. ................................... 524/908; 525/196; 525/221; 273/235 R
[58] Field of Search ............... 524/908; 525/196, 221; 273/235 R

[56] References Cited

U.S. PATENT DOCUMENTS

| | | | |
|---|---|---|---|
| 3,819,768 | 6/1974 | Molitor et al. | 525/221 |
| 4,323,247 | 4/1982 | Keches et al. | 525/221 |
| 4,911,451 | 3/1990 | Sullivan et al. | 525/196 |

FOREIGN PATENT DOCUMENTS

| | | |
|---|---|---|
| 0407049 | 1/1991 | European Pat. Off. |
| 2637810 | 4/1990 | France |
| 63-229077 | 9/1988 | Japan |
| 2144130 | 2/1985 | United Kingdom |

*Primary Examiner*—Paul R. Michl
*Assistant Examiner*—Peter Szekely
*Attorney, Agent, or Firm*—Birch, Stewart, Kolasch & Birch

[57] ABSTRACT

Disclosed is a golf ball which is excellent in ball velocity, flying distance and low-temperature durability, by using an ionomer resin of an ethylene-acrylic acid copolymer as the cover resin. The golf ball comprises a core and a cover covering said core, the cover has a total neutralization degree of 30 to 60% of which at least 10% is neutralized with divalent metal ions and is prepared by mixing specific ethylene-acrylic copolymer type ionomer resins.

7 Claims, No Drawings

GOLF BALL

This application is a continuation of application Ser. No. 07/638,808 filed on Jan. 8, 1991, now abandoned.

FIELD OF THE INVENTION

The present invention relates to a golf ball. More particularly, it relates to a golf ball which comprises a core and a specific ethylene-acrylic acid copolymer type ionomer resin covering the core, having superior ball velocity, excellent flying properties and good low temperature durability.

BACKGROUND OF THE INVENTION

Before the early 1980s, golf balls generally were thread wound golf balls which comprised a thread wound core and a balata cover, which mainly contains transpolyisoprene, covering the core. In the late 1980s, a solid core was developed instead of the thread wound core and was covered with an ionomer resin of ethylene-methacrylic acid copolymer commercially available from DuPont Company, instead of the balata cover to form a two piece golf ball. The two piece construction is being employed at present.

The two piece golf balls have become very popular among most of amateur golfers in these days, while the thread wound golf balls covered by the balata cover are regularly used only by skilled amateur golfers or professional golfers. This would be based on the reason that the ionomer resin has high cut resistance and is cheaply available, in comparison with the balata resin. The ionomer resin is commercially available from DuPont Company as SURLYN and in Japan available from Mitsui DuPont Polychemical Co., Ltd. as HI-MILAN.

The ionomer resin which is used for the cover of golf balls, however, is generally an ethylene-methacrylic acid copolymer, and no golf balls of which the cover is an ethylene-acrylic acid copolymer have been ever made and available. For example, U.S. Pat. No. 3,819,768 and Japanese Kokai Publication 119766/1982 suggests that a golf ball cover is formed by ionomer resins, but all ionomer resins are SURLYN (or HI-MILAN), i.e. the ethylene-methacrylic acid copolymer.

The two piece golf balls of which the cover resin is the ethylene-methacrylic acid copolymer are still desired to improve ball velocity, flying distance and feeling when hitting the balls. Especially, flying distance and ball velocity are desired to be improved, because every golfer wishes to increase flying distance.

SUMMARY OF THE INVENTION

The present invention provides a golf ball which is excellent in ball velocity, flying distance and low-temperature durability, by using an ionomer resin of an ethylene-acrylic acid copolymer as the cover resin. The golf ball comprises a core and a cover covering said core, the cover has a total neutralization degree of 30 to 60% of which at least 10% is neutralized with divalent metal ions and is prepared by mixing (A) an ionomer resin having a melt index of 0.5 to 5.0 g/10 min and a stiffness modulus of at least 3,000 Kg/cm$^2$, prepared from a copolymer of 10 to 25% by weight of acrylic acid and the balance of ethylene (hereinafter referred to as "ethylene-acrylic acid copolymer") of which 20 to 70 mol % of the carboxyl groups is neutralized with alkali metal ions, and the ethylene-acrylic acid copolymer before neutralization having a melt index of 20 to 150 g/10 min, and (B) an ionomer resin having a melt index of 0.5 to 5.0 g/10 min and a stiffness modulus of at least 1,500 Kg/cm$^2$, prepared from an ethylene-acrylic copolymer of which 25 to 70 mol % of the carboxyl groups is neutralized with divalent metal ions, and the ethylene-acrylic acid copolymer before neutralization having a melt index of 20 to 150 g/10 min, in a weight ratio (A/B) of 80/20 to 30/70.

DETAILED DESCRIPTION OF THE INVENTION

First of all, the developing process of the present invention is explained. Ionomer resins are known as a copolymer of an alpha-olefin, an alpha, beta-ethylenically unsaturated carboxylic acid, an alpha, beta-ethylenically unsaturated carboxylic metal salt and optionally an alpha, beta-ethylenically unsaturated carboxylic ester. Various kinds of ionomer resins are commercially available. However, for the cover for golf balls, only the ionomer resin of the ethylene-methacrylic acid has been used. The present inventors have found that an ethylene-acrylic acid type ionomer resin can be used for the cover resin of the golf ball, if its acid content, selection of neutralizing metals and neutralization degree are specified. The golf balls using such cover resin have excellent flying properties, i.e. superior ball velocity, but have drawbacks in low-temperature durability. In order to improve low-temperature durability, it has been found that two specific ethylene-acrylic acid type ionomer resins can be further limited by melt index, stiffness modulus etc. and blended. The golf balls of which the cover is the blended one surprisingly has excellent flying properties, i.e. superior ball velocity, and also improved low-temperature durability. Japanese Kokai Publication 268779/1990 corresponding U.S. Pat. No. 4,911,451 discloses that a blend of two ethylene-acrylic acid type copolymers, one of which is neutralized with sodium ions and the other is neutralized with zinc ions, is used as a cover resin for golf balls. The reference, however, does not teach the limitation of melt index and stiffness modulus of each ionomer resin and the neutralization degree of the resin blend. The limitations of the present invention provide the people in the art a guideline of how the resins for blend are selected for obtaining golf ball having highly improved properties.

The cover of the present invention is a mixture of the ethylene-acrylic acid copolymer of which the carboxylic acid group are neutralized with alkali ions, i.e. ionomer resin (A), with the ethylene-acrylic acid copolymer of which the carboxylic acid are neutralized with divalent metal ions, i.e. ionomer resin (B). The alkali metal for neutralization includes lithium, sodium, potassium and the like, but preferred are lithium and sodium. The divalent metal for neutralization includes zinc, copper or an alkali earth metal (e.g. magnesium and calcium).

The base ethylene-acrylic acid copolymer of both ionomer resins has an acrylic acid content of 10 to 25% by weight and a melt index of 20 to 150 g/10 min. If the acrylic acid content is less than 10% by weight, stiffness modulus and cut resistance are poor. If the content is more than 25% by weight, stiffness modulus is too high, thus deteriorating feeling when the ball is hit and durability after hitting many times. If the melt index is less than 20 g/10 min, molding properties are poor. If the melt index is more than 150 g/10 min, molecular weight is reduced and rebound resilience is poor. The base copolymer may be the same or different between the ionomer resins (A) and (B). It is preferred that the copolymer is common between the two ionomer resins (A) and (B), because the obtained mixture of the resins has good properties.

The ionomer resin (A) has a neutralization degree of 20 to 70%, preferably 30 to 60%, a melt index of 0.5 to 5.0 g/10 min and a stiffness modulus of at least 3,000 Kg/cm$^2$, preferably 3,000 to 5,000 Kg/cm$^2$. Neutralization degrees of less than 20% reduce ball velocity and those of more than 70% deteriorate molding properties. Stiffness modulus values of less than 3,000 Kg/cm$^2$ reduce ball velocity.

The ionomer resin (B) has a neutralization degree of 25 to 70%, preferably 35 to 60%, a melt index of 0.5 to 5.0 g/10 min and a stiffness modulus of at least 1,500 Kg/cm$^2$, preferably 1,500 to 4,500 Kg/cm$^2$. If the neutralization degree is less than 25%, ball velocity is poor and low-temperature durability also is poor. If the neutralization degree is more than 70%, molding properties and ambient-temperature durability are deteriorated. Stiffness modulus values of less than 1,500 Kg/cm$^2$ reduce ball velocity.

The cover resin of the present invention is a mixture of the ionomer resins (A) and (B). The weight ratio (A/B) of the mixture is within the range of 80/20 to 30/70, preferably 70/30 to 40/60. If the ionomer resin (B) is less than 20% by weight in the mixture, low-temperature durability is not sufficiently improved. If the ionomer resin (B) is more than 70% by weight, ball velocity is reduced. It is required that the ionomer resin mixture has a total neutralization degree of 30 to 60%. Values of less than 30% reduce ball velocity and those of more than 60% reduce molding properties. It is also required that at least 10% of the total neutralization degree is neutralized with the divalent metal ions. If it is less than 10%, low-temperature durability is poor.

The neutralization is generally carried out by reacting the base copolymer with a corresponding metal (i.e. alkali metal or divalent metal) compound, such as hydroxides, acetic acid salts, carbonate and the like. For example, the metal compound and the base ethylene-acrylic acid copolymer are mixed in an extruder at a temperature of 200° to 250° C.

The cover resin of the present invention is a mixture of the ionomer resins (A) and (B), but other resins, such as an ethylene-methacrylic type ionomer resin, polyolefin, polyester elastomer and polyamide may be added thereto within the range that the properties of the cover resin are not deteriorated. An amount of the other resins is preferably limited to less than 20% by weight. The cover resin may also contain a pigment, a filler for controlling the specific weight of the golf ball, a dispersant, an antioxidant, a ultraviolet absorber, a light stabilizer and the like.

The golf ball core to be covered by the cover resin can be either a solid core which is solidly molded from rubber, or a thread-wound core which is prepare by winding rubber thread on a center. The solid core may be prepared from a rubber composition which comprises 100 parts by weight of a polybutadiene rubber, 10 to 50 parts by weight of a cocrosslinking agent (e.g. an alpha, betamonoethylenically carboxylic acid, such as acrylic acid and methacrylic acid, or a salt thereof; a functional monomer, such as trimethylolpropane trimethacrylate), 10 to 30 parts by weight of a filler (e.g. zinc acetate and barium sulfate), 0.5 to 5.0 parts by weight of a peroxide (e.g. dicumylperoxide), 0.1 to 1.0 of an antioxidant. The rubber composition may be press-vulcanized at a temperature of 140° to 170° C. for 10 to 40 minutes to form a spherical solid core. The thread rubber for the thread-wound core is not limited, for example prepared by vulcanizing a rubber composition containing natural rubber (or a combination of natural rubber and a synthetic polyisoprene), an antioxidant, a vulcanization promoter, sulfur and the like. The center for the thread-wound core can be either liquid type or rubber type. The rubber type center can be prepared from the same rubber composition as the solid core. The above solid core and center are one of a number of examples examples, which do not limit them to the above mentioned compositions.

The golf ball of the present invention can be prepared by covering a golf ball core with the cover resin. The covering method can be any methods used in this field, for example an injection molding.

EXAMPLES

The present invention is illustrated with the following examples which, however, are not to be construed as limiting the present invention to their details.

EXAMPLES 1 TO 7 AND COMPARATIVE EXAMPLES 1 TO 8

Preparation of a Solid Core

A rubber composition was prepared by mixing 100 parts by weight of cis-1,4-polybutadiene (available from Japan Synthetic Rubber Co., Ltd. as JSR BR01), 30 parts by weight of zinc acrylate (available from Nippon Shokubai Kagaku Kogyo Co., Ltd.), 20 parts by weight of zinc oxide (available from Toho Zinc Co., Ltd.) and 1 part by weight of dicumyl peroxide (available from Nippon Oil and Fat Co., Ltd.). The composition was vulcanized at 150° C. for 30 minutes to form a solid core having an average diameter of about 38.5 mm.

Preparation of Cover Resins (a) EAA-Na (neutralization degree 42%)

A master batch was prepared by mixing an ethylene-acrylic acid copolymer (available from Exxon Company as EX-248 which had an acrylic acid content of about 16 wt % and a melt index of 50 g/10 min) and sodium carbonate ($Na_2CO_3 \cdot H_2O$) in a weight ratio of 50/50 by a twin roll to form a sheet which was then ground. Next, 100 parts by weight of the same ethylene-acrylic acid copolymer was extruded with 12 parts by weight of the master batch using a biaxial extruder.

Extruding conditions were a screw diameter of 45 mm, a screw rotating rate of 50 rpm and a screw L/D of 30. The cylinder temperature condition were as follow;

| Barrel | 1 | 2 | 3 | 4 | 5 | 6 | 7 | Die |
|---|---|---|---|---|---|---|---|---|
| Temp.(°C.) | 200 | 200 | 200 | 230 | 250 | 250 | 250 | 250 |

The extruded resin was transparent and analyzed by a Fourier transform infrared spectrometer (available from Shimadzu Corp. as FT.IR-4200) to find that an absorption at 1,700 cm$^{-1}$ (—COOH) disappeared and a new absorption peak at 1,560 cm$^{-1}$ (—COONa) appeared. The infrared spectrum showed that the ionization was accomplished. A concentration of sodium ions was determined by an atomic-absorption spectroscopy to find 2.1% by weight, thus completely reacting the sodium carbonate. An apparatus for the atomic-absorption spectroscopy is a polar Zeeman atomic-absorption spectrometer 180-80 type available from Hitachi, Ltd.

(b) EAA-Na (neutral degree 44%)

The ionomer resin was prepared as generally described in (a), with the exception that an ethylene-acrylic acid copolymer (available from Exxon Company as EX-526 which had an acrylic acid content of about 18% by weight and a melt index of 120 g/10 min) was employed. The obtained resin had a sodium content of 2.5% by weight.

(c) EAA-Na (neutralization degree 20%)

The ionomer resin was prepared as generally described in (a), with the exception that an ethylene-acrylic acid copolymer (available from Mitsubishi Petrochemical Co. Ltd. as Yukaron AW-500, which had an acrylic acid content of 20% by weight and a melt index of 300 g/10 min, was employed. The obtained resin had a sodium content of 1.3% by weight.

(d) EAA-Na (neutralization degree 40%)

The ionomer resin was prepared as generally described in (a), with the exception that an ethylene-acrylic acid copolymer (available from Dow Chemical Company as EAA 459) which had an acrylic acid content of 8% by weight and a melt index of 9 g/10 min, was employed. The obtained resin had a sodium content of 1.0% by weight.

(e) EAA-Li (neutralization degree 30%)

The ionomer resin was prepared as generally described in (a), with the exception that lithium hydroxide was employed instead of sodium carbonate. The obtained resin had a lithium content of 0.45% by weight.

(f) EAA-Zn (neutralization degree 35%)

A master batch was prepared by mixing the same ethylene-acrylic acid copolymer as (a), 50% by weight of zinc oxide and 1.5% by weight of zinc acetate by a twin roll to form a sheet which was then ground. Next, 100 parts by weight of the same ethylene-acrylic acid copolymer was extruded with 6 parts by weight of the master batch using a biaxial extruder.

The extruded resin was transparent and analyzed by a Fourier transform infrared spectrometer to find that zinc oxide was completely reacted. A concentration of zinc ions was determined by ICP emission spectroscopic analysis using an apparatus (available from Seiko Electronic Co., Ltd. as ICP SPS1100) to find about 2.5% by weight.

(g) EAA-Zn (neutralization degree 27%)

The ionomer resin was prepared as generally described in (f), using the same ethylene-acrylic acid copolymer. The obtained resin had a zinc content of 1.9% by weight.

(h) EAA-Zn (neutralization degree 22%)

The ionomer resin was prepared as generally described in (f), using the same ethylene-acrylic acid copolymer. The obtained resin had a zinc content of about 1.6% by weight.

(i) EAA-Mg (neutralization degree 35%)

A master batch was prepared by mixing the same ethylene-acrylic acid copolymer as (f) and magnesium hydroxide in a weight ratio of 50/50 by a twin roll to form a sheet which was then ground. Next, 100 parts by weight of the same ethylene-acrylic acid copolymer was extruded with 3.2 parts by weight of the master batch using a biaxial extruder.

The extruded resin was transparent and analyzed by a Fourier transform infrared spectrometer to find that a new absorption peak at 1,590 cm$^{-1}$ appeared. The infrared spectrum showed that ionization was completely accomplished. A concentration of sodium ions was determined by an atomic-absorption spectroscopy to find about 0.95% by weight.

(j) EMAA-Na (neutralization degree 30%)

An ionomer resin available from Mitsui DuPont Polychemicals Co., Ltd. as Hi-Milan 1605, having a methacrylic acid content of 15% by weight.

(k) EMAA-Zn (neutralization degree 60%)

An ionomer resin available from Mitsui DuPont Polychemicals Co., Ltd. as Hi-Milan 1706, having a methacrylic acid content of 15% by weight.

(l) EMAA-Na (neutralization degree 60%)

An ionomer resin available from Mitsui DuPont Polychemicals Co., Ltd. as Hi-Milan 1707 having a methacrylic acid content of 15% by weight.

If the resins (a) to (i) were not turned to transparent by the first extruding, extruding was conducted two times to completely react.

The ionomer resins (a) to (1) were blended by the weight ratio described in Tables 1 to 3 and then mixed with 2 parts by weight of titanium oxide (TiO2) by an extruder to form a cover composition.

The above obtained core was covered with the cover resin mixture by injection molding to form a two piece golf ball. The ball was coated with a paint to obtain a golf ball having a diameter of 42.8 mm. The obtained golf ball was evaluated by ball weight, compression, initial velocity, durability, low-temperature durability, flying distance (carry), stiffness modulus of cover and melt index of cover and the results are shown in Tables 2 and 3.

In Table 1, the difference of physical properties between the ethylene-acrylic acid copolymer type ionomer resin and the ethylene-methacrylic acid copolymer type ionomer resin is shown. Table 1 also shows the effects of blending the ethylene-acrylic acid copolymer type ionomer resin. In Table 1, the amount of resin is based on parts by weight.

TABLE 1

| Resin name (Neutralization degree) | Sample No. | | | | | |
|---|---|---|---|---|---|---|
| | 1 | 2 | 3 | 4 | 5 | 6 |
| (a) EAA-Na (about 42%) | 50 | 100 | — | — | — | — |
| (f) EAA-Zn (about 35%) | 50 | — | 100 | — | — | — |
| (k) EMAA-ZN (about 60%) | — | — | — | 50 | 100 | — |
| (l) EMAA-Na (about 60%) | — | — | — | 50 | — | 100 |
| Ball weight (g) | 45.1 | 45.3 | 45.2 | 45.3 | 45.2 | 45.3 |

TABLE 1-continued

| Resin name | Sample No. | | | | | |
|---|---|---|---|---|---|---|
| (Neutralization degree) | 1 | 2 | 3 | 4 | 5 | 6 |
| Ball compression (PGA) | 100 | 99 | 98 | 97 | 96 | 97 |
| Ball initial velocity[1] (m/sec.) | 65.4 | 65.0 | 64.3 | 64.5 | 63.8 | 64.4 |
| Low temperature durability[2] | No breaks | All broke | No breaks | No breaks | All broke | Nine broke |
| Stiffness modulus (Kg/cm$^2$)[3] | 3,700 | 3,650 | 2,000 | 3,300 | 2,700 | 3,500 |

TABLE 2

| Resin name (Neutralization degree) | Examples No. | | | | | | |
|---|---|---|---|---|---|---|---|
| | 1 | 2 | 3 | 4 | 5 | 6 | 7 |
| (a) EAA-Na (about 42%) | 60 | 50 | — | — | 50 | — | 45 |
| (b) EAA-Na (about 44%) | — | — | 40 | — | — | — | — |
| (c) EAA-Na (about 20%) | — | — | — | — | — | — | — |
| (d) EAA-NA (about 40%) | — | — | — | — | — | — | — |
| (e) EAA-Li (about 30%) | — | — | — | 65 | — | 50 | — |
| (f) EAA-Zn (about 35%) | 40 | 50 | — | 35 | — | — | — |
| (g) EAA-Zn (about 27%) | — | — | 60 | — | — | — | 45 |
| (h) EAA-Zn (about 22%) | — | — | — | — | — | — | — |
| (i) EAA-Mg (about 35%) | — | — | — | — | 50 | 50 | — |
| (j) EMAA-Na (about 30%) | — | — | — | — | — | — | — |
| (k) EMAA-Zn (about 60%) | — | — | — | — | — | — | 10 |
| Total neutralization degree after blend (%)[4] | 39 | 38 | 34 | 31 | 38 | 32 | 37 |
| Divalent metal neutralization degree (%)[4] | 14 | 17 | 16 | 12 | 17 | 17 | 18 |
| Ball weight (g) | 45.1 | 45.1 | 45.2 | 45.2 | 45.1 | 45.2 | 45.3 |
| Ball compression (PGA) | 100 | 100 | 100 | 100 | 98 | 99 | 99 |
| Ball initial velocity[1] (m/sec.) | 65.5 | 65.4 | 65.4 | 65.5 | 65.3 | 65.4 | 65.2 |
| Durability (index)[5] | 100 | 101 | 101 | 100 | 102 | 100 | 101 |
| Low temperature durability[2] | No breaks | No breaks | No breaks | No breaks | No breaks | No breaks | No breaks |
| Flying distance (carry in yard)[6] | 223.3 | 223.5 | 222.9 | 221.8 | 222.1 | 222.7 | 222.2 |
| Stiffness modulus of cover (Kg/cm$^2$)[3] | 3,800 | 3,700 | 3,750 | 3,700 | 3,600 | 3,650 | 3,600 |
| Melt index of cover resin[7] | 1.9 | 1.8 | 2.0 | 1.7 | 1.6 | 1.7 | 1.8 |

TABLE 3

| Resin name | (Neutralization degree) | Comparative Examples No. | | | | | | | |
|---|---|---|---|---|---|---|---|---|---|
| | | 1 | 2 | 3 | 4 | 5 | 6 | 7 | 8 |
| (a) EAA-Na | (about 42%) | — | 30 | 60 | — | — | — | 50 | — |
| (b) EAA-Na | (about 44%) | — | — | — | — | — | — | — | — |
| (c) EAA-Na | (about 20%) | — | — | — | 60 | — | 60 | — | 50 |
| (d) EAA-Na | (about 40%) | — | — | — | — | 60 | — | — | — |
| (e) EAA-Li | (about 30%) | — | — | — | — | — | — | — | — |
| (f) EAA-Zn | (about 35%) | — | 20 | — | — | — | — | — | — |
| (g) EAA-Zn | (about 27%) | — | — | — | — | — | — | — | — |
| (h) EAA-Zn | (about 22%) | — | — | 40 | — | 40 | 40 | — | 50 |
| (i) EAA-Mg | (about 35%) | — | — | — | 40 | — | — | — | — |
| (j) EMAA-Na | (about 30%) | 60 | 50 | — | — | — | — | — | — |
| (k) EMAA-Zn | (about 60%) | 40 | — | — | — | — | — | 50 | — |
| Total neutralization degree after blend (%)[4] | | 42 | 34 | 34 | 26 | 32 | 20 | 51 | 20 |
| Divalent metal neutralization degree (%)[4] | | 24 | 7 | 8 | 14 | 8 | 8 | 30 | 11 |
| Ball weight (g) | | 45.2 | 45.3 | 45.4 | 45.4 | 45.4 | 45.4 | 45.4 | 45.5 |
| Ball compression (PGA) | | 98 | 98 | 100 | 97 | 95 | 97 | 98 | 95 |
| Ball initial velocity[1] (m/sec.) | | 64.6 | 64.8 | 65.0 | 64.8 | 64.3 | 64.8 | 64.5 | 64.9 |
| Durability (index)[5] | | 102 | 100 | 102 | 101 | 103 | 100 | 97 | 101 |
| Low temperature durability[2] | | No breaks | All broke | All broke | Five broke | Nine broke | All broke | No breaks | All broke |
| Flying distance (carry in yard)[6] | | 216.3 | 217.9 | 218.3 | 217.5 | 214.8 | 215.7 | 216.9 | 218.7 |
| Stiffness modulus of cover (Kg/cm$^2$)[3] | | 3,400 | 3,450 | 3,500 | 3,300 | 3,450 | 3,300 | 3,450 | 3,300 |

TABLE 3-continued

| Resin name (Neutralization degree) | Comparative Examples No. | | | | | | | |
|---|---|---|---|---|---|---|---|---|
| | 1 | 2 | 3 | 4 | 5 | 6 | 7 | 8 |
| Melt index of cover resin[7] | 1.9 | 2.3 | 2.1 | 2.2 | 2.4 | 2.8 | 1.4 | 2.9 |

[1]Ball initial velocity: A golf ball was hit by a No. 1 wood at a head speed of 45 m/s using a swing robot (available from True Temper Co., Ltd.) and its initial velocity was determined. Determination was carried out on 10 balls and the result is shown in an average value.

[2]Low-temperature durability: Ten golf balls were stored at −30° C. and then struck to a metal board at 45 m/s by an air gun up to 50 times. Number of the broken balls are shown in Tables.

[3]Stiffness modulus of cover: This was determined by a stiffness tester (available from Toyo Seiki Co., Ltd.). A sample for the determination was prepared by press-molding to form a plain plate and allowing to stand at 23° C. at a relative humidity of 50% for 2 weeks.

[4]Amount of the remaining acid groups and Neutralization degree: The cover resin was dissolved in a hot tetrahydrofuran, which was titrated with potassium hydroxide with heating to determine the remaining carboxyl group (COOH). The metal content (COOM), i.e. alkali metal and divalent metal, was determined by atomic analysis. The neutralization degree was obtained from the equation;

$$\text{Neutralization degree (\%)} = \frac{[COOM]}{[COOH] + [COOM]} \times 100$$

[5]Durability: A golf ball was struck to a metal board at a speed of 45 m/s and the number of striking was determined until the ball was broken. The number is expressed as an index number when the number of Example 1 is made 100.

[6]Flying distance: A golf ball was hit by a No. 1 wood at a head speed of 45 m/s using a swing robot (available from True Temper Co., Ltd.) and its flying distance of carry was determined. Determination was carried out on 10 balls and the result is shown in an average value.

[7]Melt index; JIS-K6760 at 190° C. at a load of 2160 g.

As is shown in Table 1, the sample No. 1 (a blend of (a) EAA-Na and (f) EAA-Zn) has a faster initial velocity and excellent durability in comparison with the samples Nos. 4-6 ((k) EMAA-Zn or (1) EMAA-Na). The sample No. 2 (solely using (a) EAA-Na) has a fast initial velocity, but has poor low-temperature durability. The sample No. 3 (solely using (f) EAA-Zn) has good low-temperature durability, but is poor in ball initial velocity and stiffness modulus.

Accordingly, it is apparent from the above results that the blended resin of the EAA-Na and EAA-Zn provides good physical properties and good cover materials for golf balls.

As is shown in Tables 2 and 3, the golf balls of Examples 1 to 7 in which a blend of EAA-Na and EAA-Zn or Mg was employed as a cover resin have faster initial velocity (i.e. high rebound resilience) and further flying distance, in comparison with the golf ball of Comparative Example 1 in which a conventional ionomer resin was used as a cover resin. Especially, the golf ball of Example 7 in which the cover resin contained 10 parts by weight of the conventional ethylene-methacrylic acid copolymer type ionomer resin (i.e. (1) EMAA-Zn) had faster initial velocity and excellent flying properties. The golf ball of Comparative Example 2, in which the cover contained 50% by weight of the ethylene-methacrylic acid type ionomer resin (i.e. (k) EMAA-Na), has poor initial velocity and poor low-temperature durability. The golf ball of Comparative Example 3, although a blend resin of the two ethylene-acrylic acid type ionomer resins (i.e. (a) EAA-Na and (h) EAA-Zn) was employed as a cover resin, had poor initial velocity and poor low-temperature durability because of the lower neutralization degree of the divalent metal ions after blending. The golf ball of comparative Example 4, although a blend of resin of the two ethylene-acrylic acid type ionomer resins (i.e. (a) EAA-Na and (i) EAA-Mg) was employed as a cover resin, had poor ball initial velocity and poor low-temperature durability because of the lower total neutralization degree of blending. The golf balls of Comparative Examples 5 and 6, although a blend resin of the two ethylene-acrylic acid type ionomer resins (i.e. (d) EAA-Na and (h) EAA-Zn for Comparative Example 5 and (c) EAA-Na and (h) EAA-Zn for Comparative Example 6) was employed as a cover resin, had poor initial velocity and poor low-temperature durability because of the lower neutralization degree of the divalent metal ions after blending. The golf ball of Comparative Example 7, in which the ethylene-methacrylic acid type ionomer resins (i.e. (a) EMAA-Zn) was present in an amount of 50% by weight, had poor initial velocity. The golf ball of Comparative Example 8, although a blend resin of the two ethylene-acrylic acid type ionomer resins (i.e. (c) EAA-Na and (h) EAA-Zn) was employed as a cover resin, had poor initial velocity and poor low-temperature durability because of the lower total neutralization degree after blending.

What is claimed is:

1. A golf ball comprising a core and a cover covering said core, said cover has a total neutralization degree of 30 to 60% of which at least 10% is neutralized with divalent metal ions and is prepared by mixing
    (A) an ionomer resin having a melt index of 0.5 to 5.0 g/10 min and a stiffness modulus of 3,000 to 5,000 Kg/cm$^2$, prepared from a copolymer of about 16 to 25% by weight of acrylic acid and the balance of ethylene (hereinafter referred to as "ethylene-acrylic acid copolymer") of which 20 to 70 mol % of the carboxyl groups is neutralized with alkali metal ions, and said ethylene-acrylic acid copolymer before neutralization having a melt index of 20 to 150 g/10 min, and
    (B) an ionomer resin having a melt index of 0.5 to 5.0 g/10 min and a stiffness modulus of 2,000 to 4,500 Kg/cm$^2$, prepared from an ethylene-acrylic acid copolymer of which 25 to 70 mol % of the carboxyl group is neutralized with divalent metal ions, and said ethylene-acrylic acid copolymer before neutralization having a melt index of 20 to 150 g/10 min,
    in a weight ratio (A/B) of 70/30 to 40/60.

2. The golf ball according to claim 1 wherein said alkali metal is lithium or sodium.

3. The golf ball according to claim 1 wherein said divalent metal is zinc, copper or an alkali earth metal.

4. The golf ball according to claim 3 wherein said alkali earth metal is magnesium or calcium.

5. The golf ball according to claim 1 wherein said cover resin contained, in addition to the mixture of said ionomer resins (A) and (B), a component selected from a group consisting of an ethylene-methacrylic type ionomer resin, polyolefin, polyester elastomer or polyamide, in an amount of less than 20% by weight.

6. The golf ball according to claim 1 wherein said core is a solid core molded from rubber.

7. The golf ball according to claim 1 wherein said core is a thread-wound core prepared by winding rubber thread on a center.

* * * * *